United States Patent [19]
Sakurai

[11] Patent Number: 5,890,143
[45] Date of Patent: Mar. 30, 1999

[54] APPARATUS FOR REFINING DETERMINATION RULE CORRESPONDING TO PROBABILITY OF INFERENCE RESULT OF EVALUATION OBJECT, METHOD THEREOF AND MEDIUM THEREOF

[75] Inventor: Shigeaki Sakurai, Tokyo, Japan

[73] Assignee: Kabushiki Kaisha Toshiba, Japan

[21] Appl. No.: 788,271

[22] Filed: Jan. 24, 1997

[30] Foreign Application Priority Data

Jan. 25, 1996 [JP] Japan ................................. 8-011220

[51] Int. Cl.$^6$ .................................................. G06F 15/18
[52] U.S. Cl. .............................................. 706/12; 706/52
[58] Field of Search ................................ 395/51, 61, 77; 706/12, 52

[56] References Cited

U.S. PATENT DOCUMENTS

| 5,222,197 | 6/1993 | Teng et al. ................................. 706/58 |
| 5,481,649 | 1/1996 | Birdwell et al. .......................... 706/59 |

OTHER PUBLICATIONS

Utgoff, Paul E., "Incremental Induction of Decision Trees", Machine Learning, vol. 4, pp. 161–186, (1989).

N. Shan and W. Ziarko, "An Incremental Learning Algorithm for Constructing Decision Rules," Proc. of the Int'l. Workshop on Rough Sets and Knowledge Discovery, pp. 326–334, Oct. 1993.

J.S.J. Lee and J.C. Bezdek, "A Feature Projection Based Adaptive Pattern Recognition Network," IEEE Int'l. Conf. on Neural Networks, vol. 1, pp. 497–505, Jul. 1988.

G. Deffuant, "Neural Units Recruitment Algorithm for Generation of Decision Trees," 1990 Int'l. Joint Conf. on Neural Networks, vol. 1, pp. 637–642, Jun. 1990.

I.K. Sethi, "Entropy Nets: From Decision Trees to Neural Networks," Proc. of the IEEE, vol. 78(1), pp. 1605–1613, Oct. 1990.

T. Elomaa and J. Kivinen, "On Inducing Topologically Minimal Decision Trees," Proc. of the 2nd Int'l. IEEE Conf. on Tools for Artificial Intelligence, pp. 746–752, Nov. 1990.

J. Rives, "FID3: Fuzzy Induction Decision Tree," Proc. First Int'l. Symposium on Uncertainty Modeling and Analysis, pp. 457–462, Dec. 1990.

W. Ziarko and N. Shan, "Machine Learning: Rough Sets Perspective," Proc. Int'l. Conf. on Expert Systems for Development, pp. 114–118, Mar. 1994.

M. Umano, et al., "Fuzzy Decision Trees by Fuzzy ID3 Algorithm and Its Application to Diagnosis Systems," Proc. Third IEEE Conf. on Fuzzy Systems, vol. 3, pp. 2113–2118. Jun. 1994.

Y. Yuan and M.J. Shaw, "Induction of Fuzzy Decision Trees," Fuzzy Sets and Systems, vol. 69(2), pp. 125–139, Jan. 1995.

J.W. Grzymala–Busse and C.P.B. Wang, "Classification and Rule Induction Based on Rough Sets," Proc. IEEE 5th Int'l. Conf. on Fuzzy Systems, vol. 2, pp. 744–747, Sep. 1996.

J. Zeidler, et al., "Fuzzy Decision Trees and Numerical Attributes," Proc. 5th IEEE Int'l. Conf. on Fuzzy Systems, vol. 2, pp. 985–990, Sep. 1996.

"Generation of Fuzzy Decision Tree by Inductive Learning," Proceedings of The Transactions of Institute of Electrical Engineers of Japan, vol. 113–c, No. 7, pp. 488–494 (1993).

"Artificial Intelligence Handbook," Kyoritsu Shuppan K.K., vol. 3, pp. 529–535, (1984).

Primary Examiner—Robert W. Downs
Attorney, Agent, or Firm—Finnegan, Henderson, Farabow, Garrett & Dunner, L.L.P.

[57] ABSTRACT

In the apparatus, an evaluation object is categorized corresponding to the value of an attribute. A first end node stores a first category class and a reliability thereof. A second end node stores a second category class and a reliability thereof. In addition, the second end node is assigned an instance used to generate this class. A branch node stores a determination rule such as a membership function for determining a grade of each category class corresponding to the value of an attribute as an evaluation object. In the apparatus, an evaluation object is categorized corresponding to the reliability and grade. In the apparatus, since an instance assigned to the first end node can be deleted, the storage capacity necessary for storing a training instance can be decreased.

21 Claims, 11 Drawing Sheets

FIG.6

|  | ROOM TEMPERATURE | HUMIDITY | AREA | CATEGORY CLASS |
|---|---|---|---|---|
| T100 | 0 DEG | 40% | 20m² | COMFORTABLE |
| T101 | 5 DEG | 60% | 30m² | COMFORTABLE |
| T400 | 27 TO 28 DEG | 90% | 50m² | UNCOMFORTABLE |

|     | ROOM TEMPERATURE | HUMIDITY | AREA |
|-----|------------------|----------|------|
| V1  | 23 DEG           | 80%      | 25m² |
| V2  | 30 TO 32 DEG     | 23%      | 60m² |
| V3  | -1 DEG           | 45%      | 70~80m² |
|     |                  |          |      |

FIG.9

| | ROOM TEMPERATURE | HUMIDITY | AREA | CATEGORY CLASS |
|---|---|---|---|---|
| W1 | 30 TO 32 DEG | 23% | 60m² | COMFORTABLE |
| W2 | -1 DEG | 45% | 70~80m² | UNCOMFORTABLE |
| | | | | |

APPARATUS FOR REFINING DETERMINATION RULE CORRESPONDING TO PROBABILITY OF INFERENCE RESULT OF EVALUATION OBJECT, METHOD THEREOF AND MEDIUM THEREOF

BACKGROUND OF THE INVENTION

1. Field of the Invention

The present invention relates to an apparatus for refining a determination rule in a decision tree form that is applicable for various fields such as machine control in manufacturing fields, demand prediction in service fields, and trouble diagnoses for estimating causes of machine defects and that evaluates given data, a method thereof and a medium thereof.

2. Description of the Related Art

As a method for representing a determination rule used to evaluate given data, a decision tree is known. The decision tree is composed of branch nodes, end nodes, and branches. Attributes that represent characteristics of data are assigned to the branch nodes. Category classes that represent decisions given to data are assigned to the end nodes. The branches are labeled with conditions of attribute values that link nodes.

As a method for learning a determination rule in a decision tree form, for example, ID3 algorithm is known (see "Artificial Intelligence Handbook", Kyoritsu Shuppan K. K., Vol 3, Page 529, 1984). In the ID3 algorithm, an attribute is selected corresponding to mutual information and a training instance is divided with the selected attribute. By connecting the divided partial training instance and a node corresponding to the original training instance, the determination rule in the decision tree form is grown. In addition, in the ID3 algorithm, by giving an evaluation object to the generated decision tree, the feature amount of the evaluation object can be estimated.

However, the ID3 does not include a function for refining a decision tree. Thus, to learn a decision tree corresponding to a newly obtained instance, the decision tree should be relearnt with a training instance used to learn the decision tree and the newly obtained training instance. Thus, to relearn a decision tree, a memory with a large storage capacity is required so as to store a large number of training instances. In addition, since the past learnt result is not used for relearning a decision tree, training instances should be learnt once again from the beginning. Thus, it takes a long time.

As another method for learning a determination rule in a decision tree form, ID5R algorithm is known. The ID5R algorithm is described in for example "P. E. Utgoff, Incremental Induction of Decision Trees," Machine Learning, No. 4, P.P. 161–181, 1989. In the ID5R algorithm, when a new example is given, an evaluation value for determining whether or not an attribute assigned to a branch node is proper. When an attribute with the best evaluation value has not been assigned to the branch node, the attribute assigned to the branch node is changed to an attribute with the best evaluation value and a partial decision tree that follows the branch node is updated. In other words, in the ID5R algorithm, since a decision tree is refined with the past learnt results, the time-related problem is improved in comparison with the ID3 algorithm.

However, the refinement of a decision tree in the ID5R algorithm is performed with an assumption that instances are progressively given. Thus, it is not taken thought of a method to refine instance for refining the decision tree. In addition, when it is determined whether or not an attribute assigned to a branch node is proper, a training instance that has been used to learn the decision tree is required. Thus, as with the case of the ID3 algorithm, in the ID5R algorithm, a memory with a large storage capacity that stores a large number of training instances is required.

SUMMARY OF THE INVENTION

Thus, the common problems of the conventional technologies for learning determination rules in the decision tree form with instances are in that a determination rule in the decision tree form cannot be refined while it is being evaluated and that a newly obtained instance can be relearnt unless training instances that have been used are stored. Thus, in the conventional technologies, a memory with a large storage capacity that stores a large number of instances is required.

An object of the present invention is to solve such problems and provide an apparatus that allows the storage capacity of the memory that stores training instances to decrease, a method thereof and a medium thereof.

Another object of the present invention is to provide an apparatus for optimally refining an imperfect portion of a determination rule while evaluating the determination rule in a decision tree form and a method thereof.

The present invention is an apparatus for refining a determination rule corresponding to a probability of an inference result of an evaluation object, comprising, means for storing a first category class and a first reliability thereof, means for storing a second category class and a second reliability thereof, means for assigning an instance used to generate the second category class, means for storing a determination rule for determining a first grade for the first category class and a second grade for the second category class corresponding to the value of an attribute defining a feature of the evaluation object, and means for categorizing the evaluation object corresponding to the first and second reliabilities and the first and second grades.

The present invention is a method for storing a first category class and a reliability thereof, storing a second category class and a reliability thereof, assigning an instance used to generate the class, storing a determination rule for determining a grade for each category class corresponding to a value of an attribute defining a feature of an evaluation object, and categorizing the evaluation object corresponding to the value of the attribute of the evaluation object, comprising the steps of, categorizing the input evaluation object corresponding to the reliability and the grade, allowing categorized data to be input when the evaluation object is categorized corresponding to the second category class, and storing an instance having the evaluation object and the input categorized data as an instance used to generate the second category class.

The present invention is a medium on which a program, for refining a determination rule corresponding to a probability of an inference result of an evaluation object, is recorded, the program comprising, means for storing a first category class and a first reliability thereof, means for storing a second category class and a second reliability thereof, means for assigning an instance used to generate the second category class, means for storing a determination rule for determining a first grade for the first category class and a second grade for the second category class corresponding to the value of an attribute defining a feature of the evaluation object, and means for categorizing the evaluation object corresponding to the first and second reliabilities and the first and second grades.

According to the present invention, since an instance assigned to a first category class storing means can be deleted, the storage capacity of the memory that stores a training instance can be decreased. When a parameter that represents the number of instances assigned to a second category class storing means exceeds a predetermined threshold value, the second category class is divided into a fourth category class and a fifth category class. Thus, while a determination rule in a decision tree form is being evaluated, an imperfect portion of the determination rule can be determined and refined.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 6 is a table showing instances stored in an instance storing portion;

FIG. 9 is a table showing new instances stored for refining a fuzzy decision tree;

DESCRIPTION OF THE PREFERRED EMBODIMENT

Figure 1:
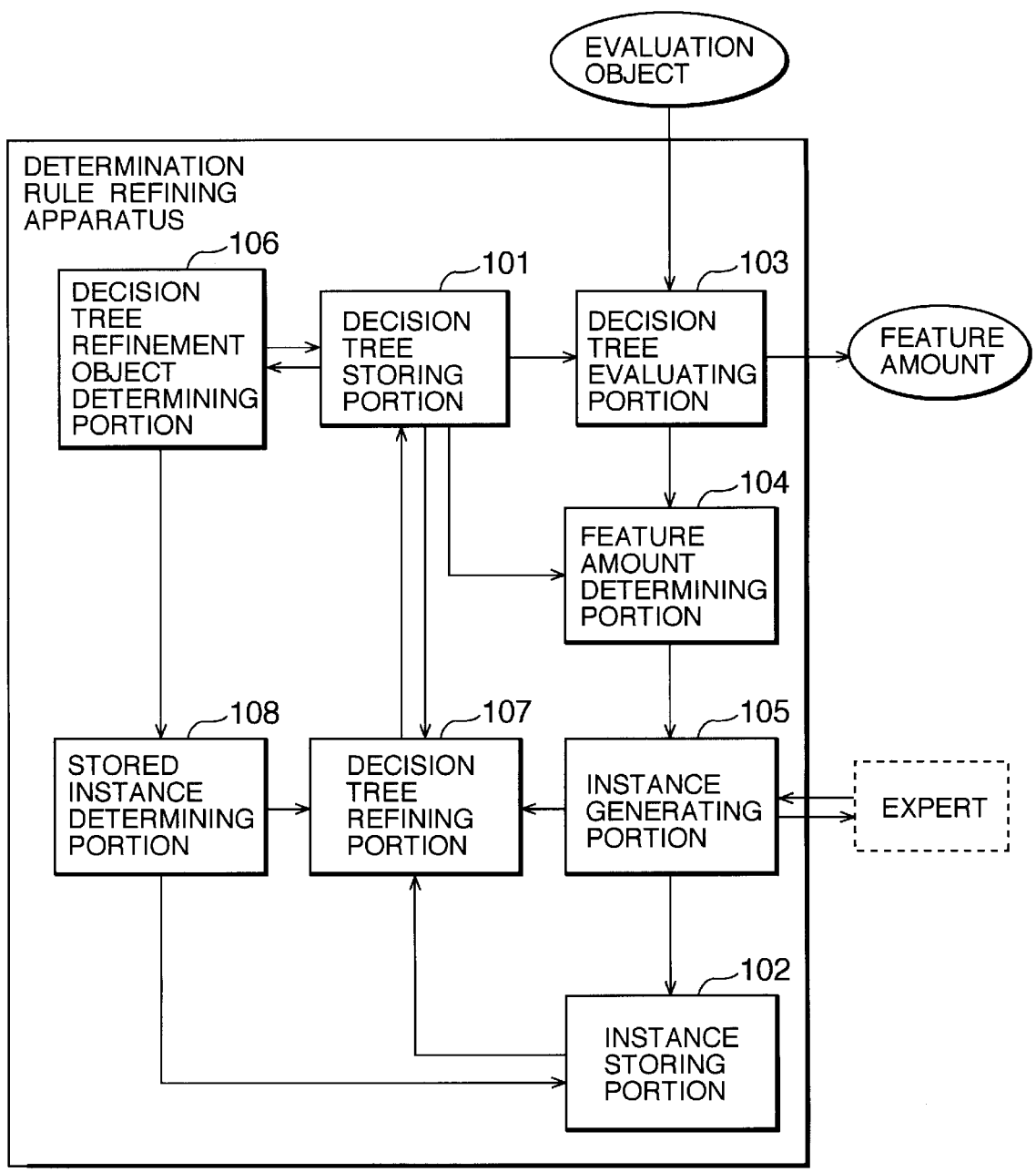
FIG. 1 is a block diagram showing the structure of a determination rule refining apparatus according to an embodiment of the present invention.

FIG. 1 is a block diagram showing the structure of a determination rule refining apparatus according to an embodiment of the present invention. The determination rule refining apparatus may be structured so that it is executed by a general purpose computer. Alternatively, the determination rule refining apparatus may be structured as an independent apparatus.

The determination rule refining apparatus is composed of a decision tree storing portion 101, an instance storing portion 102, a decision tree evaluating portion 103, a feature amount determining portion 104, an instance generating portion 105, a decision tree refinement object determining portion 106, a decision tree refining portion 107, and a stored instance determining portion 108.

The decision tree storing portion 101 stores a fuzzy decision tree that is a determination rule in a decision tree form for evaluating an object.

The instance storing portion 102 stores instances assigned to individual nodes of a fuzzy decision tree. The stored instances have evaluation objects and feature amounts that are determined results thereof.

The decision tree evaluating portion 103 estimates a feature amount of an input evaluation object with fuzzy decision trees stored in the decision tree storing portion 101.

The feature amount determining portion 104 determines the reliability (the probability) of the feature amount estimated by the decision tree evaluating portion 103.

Now, having the reliability is the case that the feature amount is less than a predetermined threshold value when the feature amount is evaluated corresponding to an evaluation function.

The instance generating portion 105 receives from an expert a real feature amount of an evaluation object of which the feature amount determining portion 104 has determined that the feature amount does not have the reliability or has not determined the feature amount, generates a new instance composed of the evaluation object and the real feature amount, and stores the new instance to the instance storing portion 102.

The decision tree refinement object determining portion 106 determines a refinement object in the fuzzy decision tree.

The decision tree refinement portion 107 refines a refinement object in the fuzzy decision tree determined by the decision tree refinement object determining portion 106 with instances including new instances generated by the instance generating portion 105.

The stored instance determining portion 108 deletes instances other than those assigned to end nodes of the fuzzy decision tree determined as refinement objects by the decision tree refinement object determining portion 106 from the instance storing portion 103.

Figure 2:
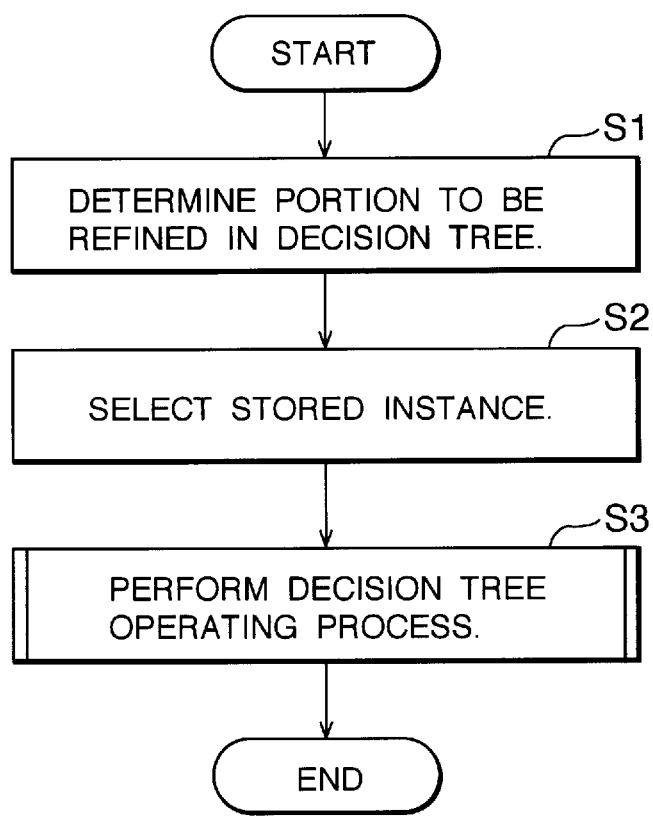
FIG. 2 is a flow chart showing a process of the determination rule refining apparatus shown in FIG. 1 just after it has learnt a fuzzy decision tree.

FIG. 2 is a flow chart showing a process of the determination rule refining apparatus just after it has learnt a fuzzy decision tree. However, it is assumed that just after the determination rule refining apparatus has learnt a fuzzy decision tree, except for the case that the fuzzy decision tree is not refined, all training instances used to learn the fuzzy decision tree have been assigned to the end nodes.

Figure 3:
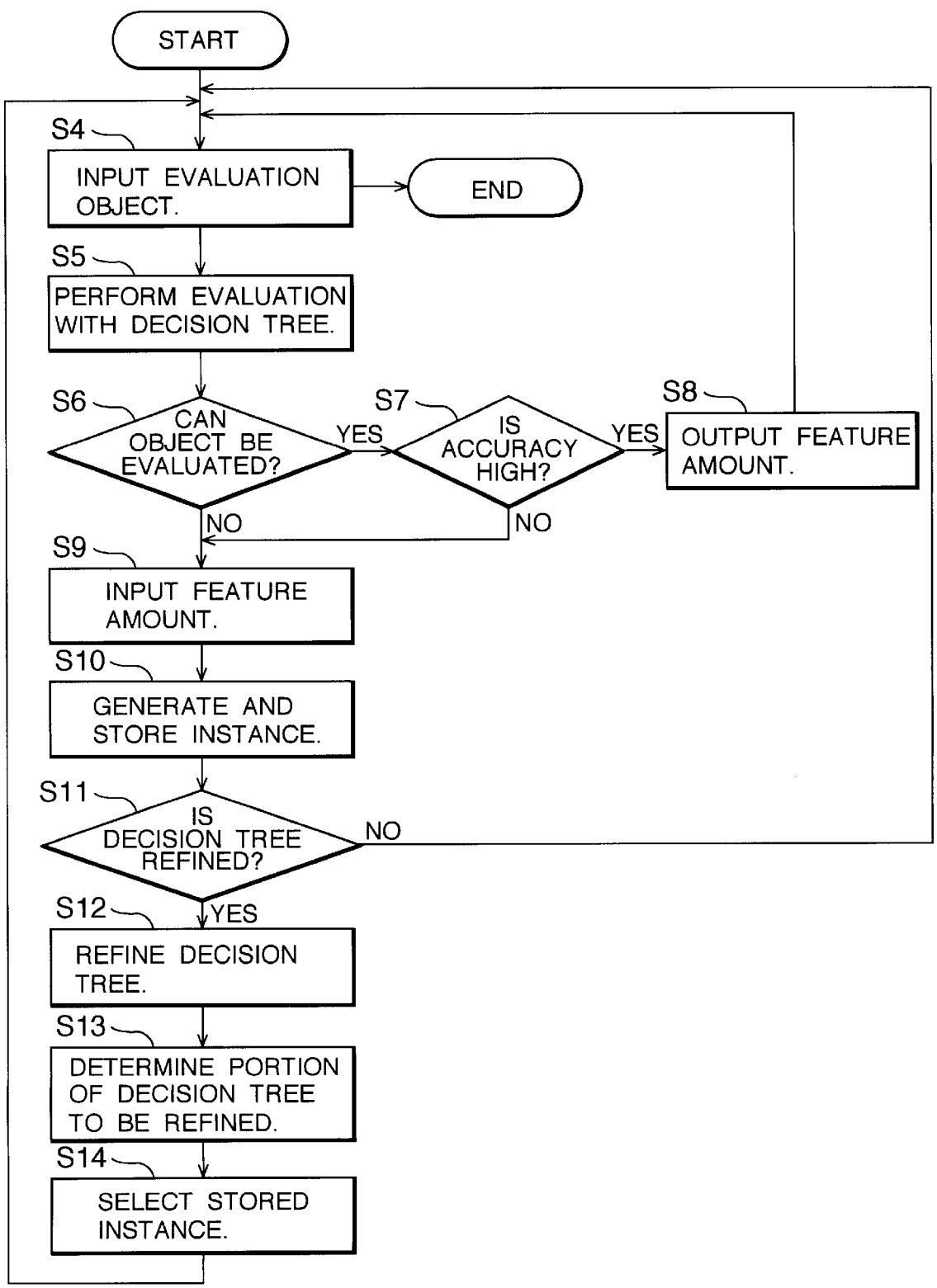
FIG. 3 is a flow chart showing a process of the determination rule refining apparatus shown in FIG. 1 in the case that it has not learnt a fuzzy decision tree.

FIG. 3 is a flow chart showing a process of the determination rule refining apparatus in the case that it has not learnt a fuzzy decision tree. This flow chart is equivalent to a decision tree operating process at step S3 in FIG. 2.

In other words, in the determination rule refining apparatus, when a fuzzy decision tree is used after the fuzzy decision tree has been learnt, pre-processes corresponding to step S1 and S2 shown in FIG. 2 are performed. When the decision tree operating process is temporarily completed and then it is performed again, it is not necessary to perform the pre-processes corresponding to steps S1 and S2 shown in FIG. 2.

Next, the case that a decision tree is learnt and then a decision tree operating process is performed will be described.

As an example of decision tree learning algorithm, IDF algorithm is used. The IDF algorithm is described in for example "Generation of Fuzzy Decision Tree by Inductive Learning", Proceedings of The Transactions of Institute of Electrical Engineers of Japan, Vol 113-c, No. 7, pp. 488–494, 1993. In the IDF algorithm, a determination rule in fuzzy decision tree form is generated with training instances composed of a discrete attribute, a numeric attribute, a fuzzy attribute, and a category class. In the IDF algorithm, a fuzzy branch determination item is generated so as to fuzzy divide a numeric attribute and a fuzzy attribute and select an attribute with a highest category class. When the attribute is a discrete attribute, the influence set is divided corresponding to attribute values. When the attribute is a numeric attribute or a fuzzy attribute, the training instance is divided corresponding to the fuzzy branch determination item. In addition, the attribute dividing process is recursively executed so as to grow the fuzzy decision tree.

Figure 4:
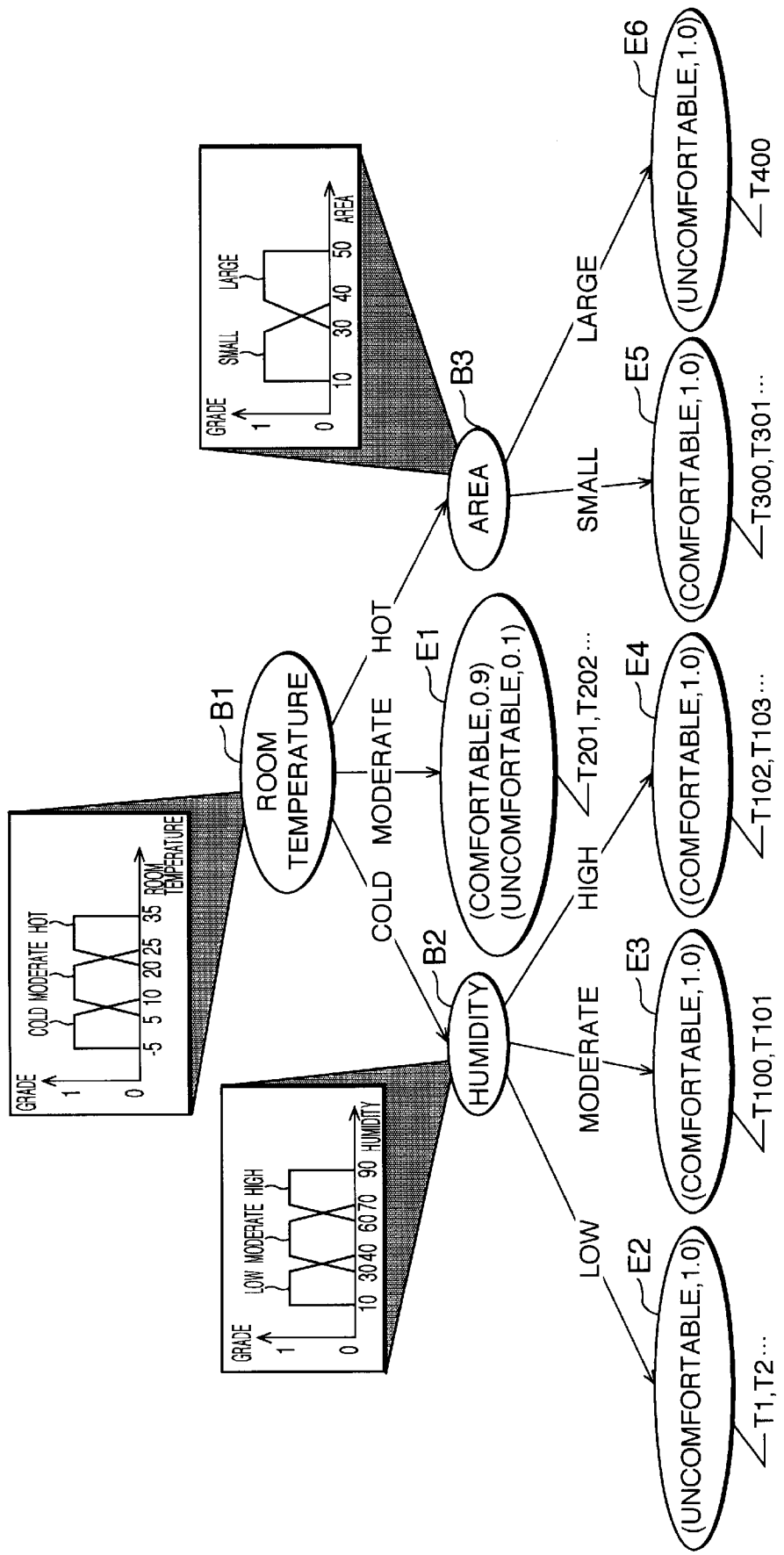
FIG. 4 is a schematic diagram showing a fuzzy decision tree generated corresponding to IDF algorithm.

Now, it is assumed that a fuzzy decision tree shown in FIG. 4 is generated corresponding to the IDF algorithm. In FIG. 4, nodes B1, B2, and B3 represent branch nodes to which attributes "room temperature, "humidity", and "area" are assigned, respectively. Nodes E1 to E6 represent end nodes to which category classes "comfortable" and "uncomfortable" are assigned, respectively. The category classes are associated with reliability. As branches that connect nodes, fuzzy branch determination items "cold", "moderate", and "hot" are assigned to the attribute "room temperature". Likewise, fuzzy branch determination items "low", "moderate", and "high" are assigned to the attribute "humidity". Likewise, fuzzy branch determination items "small" and "large" are assigned to the attribute "area". In addition, instances T1 to T400 used to generate the fuzzy decision tree are assigned to end nodes of the fuzzy decision tree.

At step S1 shown in FIG. 2, the decision tree refinement object determining portion 106 determines whether each end node of the fuzzy decision tree is treated as a refinement object. In other words, the densities of instances of individual end nodes are obtained. End nodes of which the densities of the instances are smaller than a threshold value t are treated as refinement objects. On the other hand, end nodes of which the densities of the instances are larger than the threshold value t are not treated as refinement objects. The density of each instance is obtained by formula (1).

Density of instance=(number of instances)/(area of fuzzy branch determination item)   (1)

As an example, it is determined whether or not the end node E3 of the fuzzy decision tree shown in FIG. 4 is treated as a refinement object. Since the end node E3 is assigned two instances T100 and T101, the number of instances is two. The end node E3 is a node corresponding to the fuzzy branch determination item "moderate" of the attribute "humidity" assigned to the branch node B2. At this point, the area of the region surrounded by a membership function of "normal" and the axis x becomes the area of the fuzzy branch determination item. Since the region surrounded by the membership function of the "normal" and the axis x is trapezoidal, the area becomes 30 corresponding to the following formula (2).

Area of fuzzy branch determination item=((60−40)+(70−30))×½= 30   (2)

Thus, the density of the instance of the end node E3 becomes 1/15. Assuming that the threshold value t for determining whether or not an end node is treated as a refinement object is 0.09, the end node E3 becomes a refinement object. In the case shown in FIG. 4, assuming that the same determination is performed for each end node, the end node E6 also becomes a refinement object. With respect to the end nodes E1, E2, E4, and E5, FIG. 4 shows that there are two or more instances. However, it is assumed that each end node has an instance with a threshold value t that is (0.09) or more. Thus, each end node is not a refinement object.

At step S2 shown in FIG. 2, instances other than those as refinement objects assigned to end nodes of the fuzzy decision tree by the stored instance determining portion 108 are deleted from the instance storing portion 102. In the example shown in FIG. 4, since the end nodes E3 and E6 are end nodes as refinement objects, the instances T100, T101, and T400 are stored in the instance storing portion 102. The other instances are deleted from the instance storing portion 102. FIG. 6 shows instances stored in the instance storing portion 102.

Figure 5:
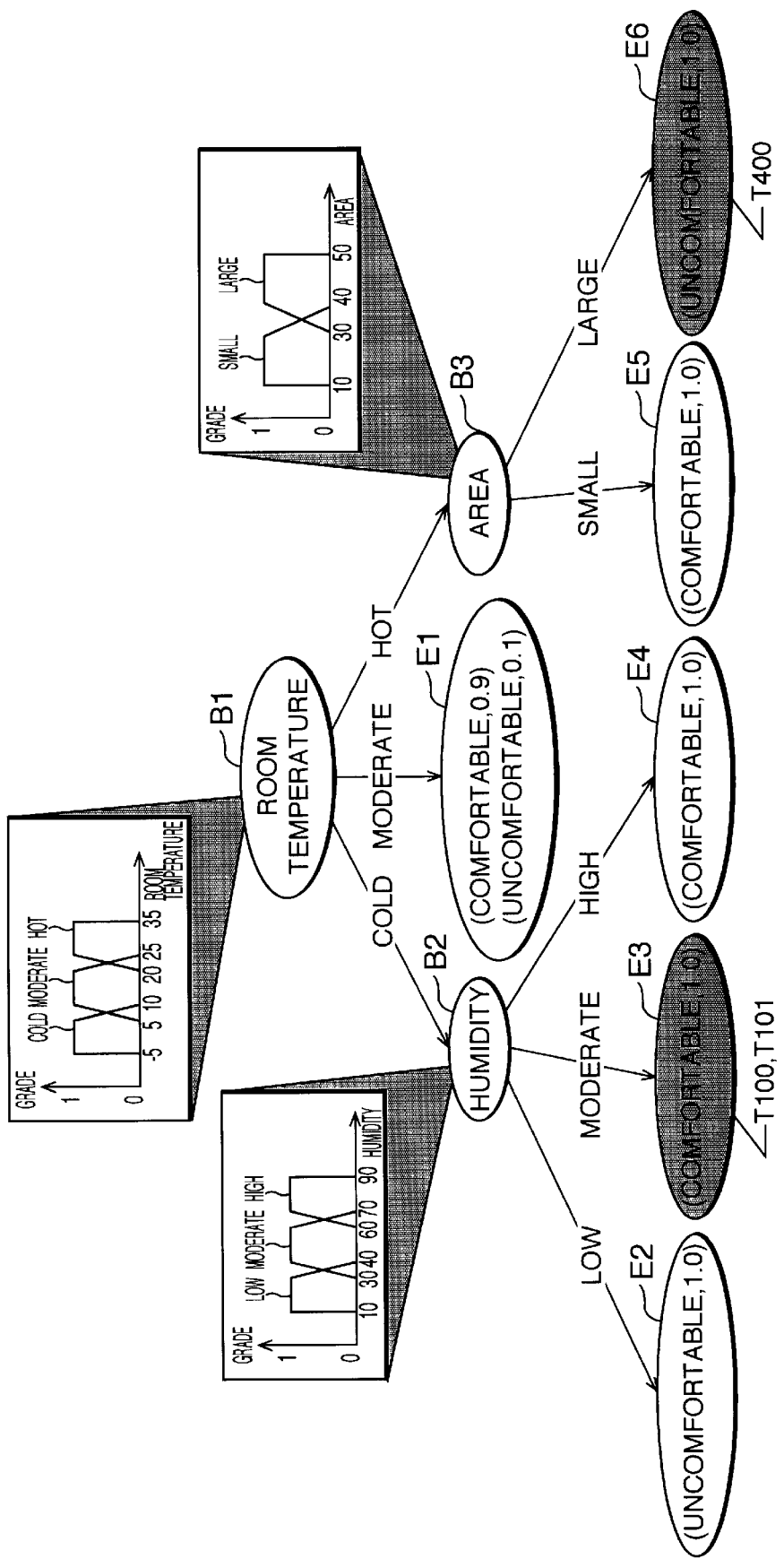
FIG. 5 is a schematic diagram showing a fuzzy decision tree of which instances other than those at end nodes as refinement objects have been deleted at step S2 shown in FIG. 2.

When the processes at steps S1 and S2 shown in FIG. 2 are executed, the fuzzy decision tree shown in FIG. 4 is changed to a fuzzy decision tree shown in FIG. 5 and stored in the decision tree storing portion 101. In this example, hatched portions of the end nodes represent end nodes as refinement objects.

At step S3 shown in FIG. 2, feature amounts of evaluation objects are estimated with the fuzzy decision tree stored in the decision tree storing portion 101. An evaluation object that has not been evaluated or that has been determined as an object with low inference accuracy and a true feature amount supplied by an expert against the evaluation object are paired and stored as a new instance to the instance storing portion 102 so as to refine the fuzzy decision tree. This process will be described with reference to a flow chart shown in FIG. 3.

At step S4 shown in FIG. 3, an evaluation object is input to the decision tree evaluating portion 103. An evaluation object is data that is composed of a plurality of attributes and that does not have a category class. For example, evaluation objects V1, V2, and V3 as shown in FIG. 7 are input to the decision tree evaluating portion 103.

At step S5 shown in FIG. 3, the feature amount of the evaluation object that has been input to the decision tree evaluating portion 103 is evaluated with the fuzzy decision tree stored in the decision tree storing portion 101.

Figures 7, 8:
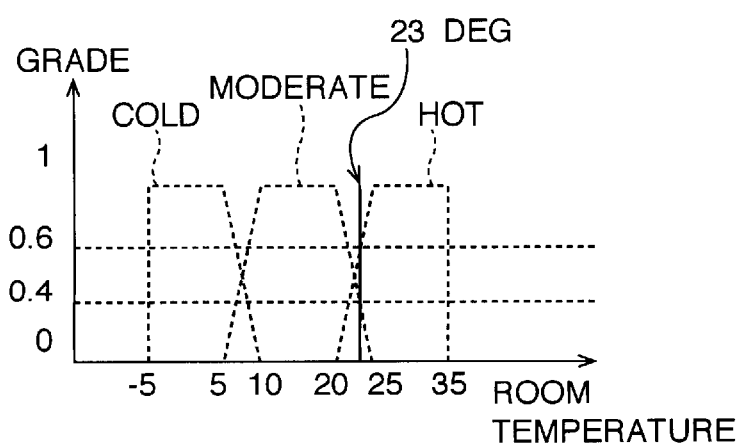
FIG. 7 is a table showing evaluation objects for evaluating feature amounts with a fuzzy decision tree.
FIG. 8 is a graph showing a method for obtaining grades of an attribute "room temperature" against fuzzy branch determination items "cold", "moderate temperature", and "hot"

For example, it is considered that the evaluation object V1 shown in FIG. 7 is evaluated with the fuzzy decision tree shown in FIG. 5. Since the attribute "room temperature" has been assigned to the highest node B1 of the fuzzy decision tree, the evaluation object V1 with respect to the attribute "room temperature" is evaluated. Since the attribute value of the attribute "room temperature" of the evaluation object V1 is "23 deg", the grades of the attribute "room temperature" against "cold", "moderate", and "hot" are assigned to "0.0", "0.6", and "0.4" as shown in FIG. 8. When the grades are normalized, the evaluation object V1 with the reliability "0.0" propagates the branch node B2. The evaluation object V1 with the reliability "0.6" propagates the branch node E1. The evaluation object V1 with the grade "0.4" propagates the branch node B3. However, since the evaluation object V1 with the grade "0.0" does not affect the estimation of the feature amount, only evaluation objects propagated to the end nodes E1 and B3 are evaluated. Since the category class "comfortable" with the reliability "0.9" and the category class "uncomfortable" with the reliability "0.1" are assigned to the end node E1, by multiplying the reliability of the evaluation object V1 by the reliability of the category class of the end node, the end node E1 obtains the category class "comfortable" with the reliability "0.54" and the category class "uncomfortable" with the reliability "0.04".

Since the attribute "area" is assigned to the branch node B3, the evaluation object V1 is re-evaluated with respect to the attribute "area". Since the attribute value "area" of the evaluation object V1 is "20 m$^2$", the grades of the attribute "area" against the fuzzy branch determination items "small" and "large" become "1.0" and "0.0", respectively. Thus, the evaluation object V1 with the reliability "0.4" reaches the end node E5. Since the category class "comfortable" with the reliability "1.0" has been assigned to the end node E5, by multiplying the reliability of the evaluation object V1 by the reliability of the category class of the end node, the end node E5 outputs the category class "comfortable" with the reliability "0.4".

Thereafter, by summing the results of the end nodes E1 and E5 for each category class, the category class "comfortable" with the reliability "0.96" and the category class "uncomfortable" with the reliability "0.04" are obtained. Finally, the category class "comfortable" with high reliability is given as the feature amount of the evaluation object V1.

Next, with reference to the fuzzy decision tree shown in FIG. 5, the case that the evaluation object V2 shown in FIG. 7 is obtained is considered. In this case, since the value of the attribute "room temperature" of the evaluation object V2 has been given as "30 to 32 deg", the evaluation object V2 with the reliability "1.0" propagates the branch node B3. Next, with respect to the attribute "area", the evaluation object V2 is evaluated. Since the attribute "area" of the evaluation object V2 is "60 m$^2$", the grades of the fuzzy branch determination items "small" and "large" of the branch node B2 become "0.0" each. Thus, the evaluation object V2 with the reliability does not propagate low nodes. Thus, it is determined that the evaluation object V2 cannot evaluated.

Next, with the fuzzy decision tree shown in FIG. 5, the case of which the evaluation object V3 shown in FIG. 7 is evaluated is considered. In this case, when the evaluation object V3 is evaluated in the same manner as the evaluation object V1 at each node, the evaluation object V3 with the reliability "1.0" propagates the branch node B2. When the evaluation object V3 is evaluated with respect to the attribute "humidity", since the value of the attribute "humidity" of the evaluation object V3 is "45%", the grades of the branch node B2 against the fuzzy branch determination items "low", "moderate", and "high" become "0.0", "1.0", and "0.0", respectively. Thus, the category class "comfortable" is estimated as the feature amount of the evaluation object V3.

At step S6 shown in FIG. 3, the flow branches depending on whether or not the decision tree evaluation portion 103 has obtained an estimated result (feature amount). In other words, when a feature amount has been estimated, the flow advances to step S7. When a feature amount has not been estimated, the flow advances to step S9. For example, since feature amounts of the evaluation objects V1 and V3 shown in FIG. 7 have been obtained, the flow advances to step S7. On the other hand, since the feature amount of the evaluation object V2 has not been obtained, the flow advances to step S9.

At step S7 shown in FIG. 3, the feature amount determining portion 104 determines whether or not an end node that an evaluation object has propagated is a node of a refinement object. Corresponding to the determined result, it is determined whether or not the accuracy of the feature amount is high. Corresponding to the determined result, the flow branches. In other words, when an evaluation object does not propagate a node as an evaluation object, it is determined that the accuracy of the feature amount is high. Thus, the flow advances to step S8. On the other hand, when an evaluation object propagates a node as a refinement object, it is determined that the accuracy of the feature amount is not high. The flow advances to step S9.

For example, when the evaluation object V1 shown in FIG. 1 is determined at step S7, since the evaluation object V1 has propagated the end nodes E1 and E5 that are not evaluation objects, it is determined that the accuracy of the feature amount is high. Thus, the flow advances to step S8. On the other hand, when the evaluation object V3 is determined at step S7, since the evaluation object V3 has propagated the end node E3 as a refinement node, it is determined that the accuracy of the feature amount is not high. Thus, the flow advances to step S9.

At step S8 shown in FIG. 3, a feature amount estimated by the decision tree evaluating portion 103 against the evaluation object is output.

At step S9 shown in FIG. 3, the instance generating portion 105 presents an evaluation object that has not been successfully evaluated at step S9 (namely, whose feature amount has not been estimated) or an evaluation object of which the accuracy of the feature amount is not high to the expert. The expert is requested to input a feature amount. For example, with respect to the evaluation objects shown in FIG. 7, since the evaluation objects V2 and V3 are evaluated at step S9, the expert is requested to input feature amounts of these evaluation objects. As feature amounts that are input by the expert, it is assumed that the evaluation object V2 is "comfortable" and the evaluation object V3 is "uncomfortable".

At step S10 shown in FIG. 3, the instance generating portion 105 generates a new instance composed of a pair of a feature amount and an evaluation object that have been input at step S9 and assigns the new instance to the last node that the evaluation object propagates. For example, in the case of the evaluation objects shown in FIG. 7, new instances W1 and W2 shown in FIG. 9 are generated for the evaluation objects V2 and V3. In addition, as shown in FIG. 10, an instance W1 is assigned to the branch node B3 and an instance W2 is assigned to the end node E3.

At step S11 shown in FIG. 3, the density of an instance of a node is calculated with the formula (1) so that the decision tree refinement object determining portion 106 determines a refinement object in the fuzzy decision tree. Next, it is determined whether or not the calculated density of the instance is larger than the threshold value t. Corresponding to the determined result, the flow branches. In other words, when the calculated density of the instance is larger than the threshold value t, the flow advances to step S12. On the other hand, when the calculated density of the instance is smaller than the threshold value t, the flow advances to step S4.

Figure 10:
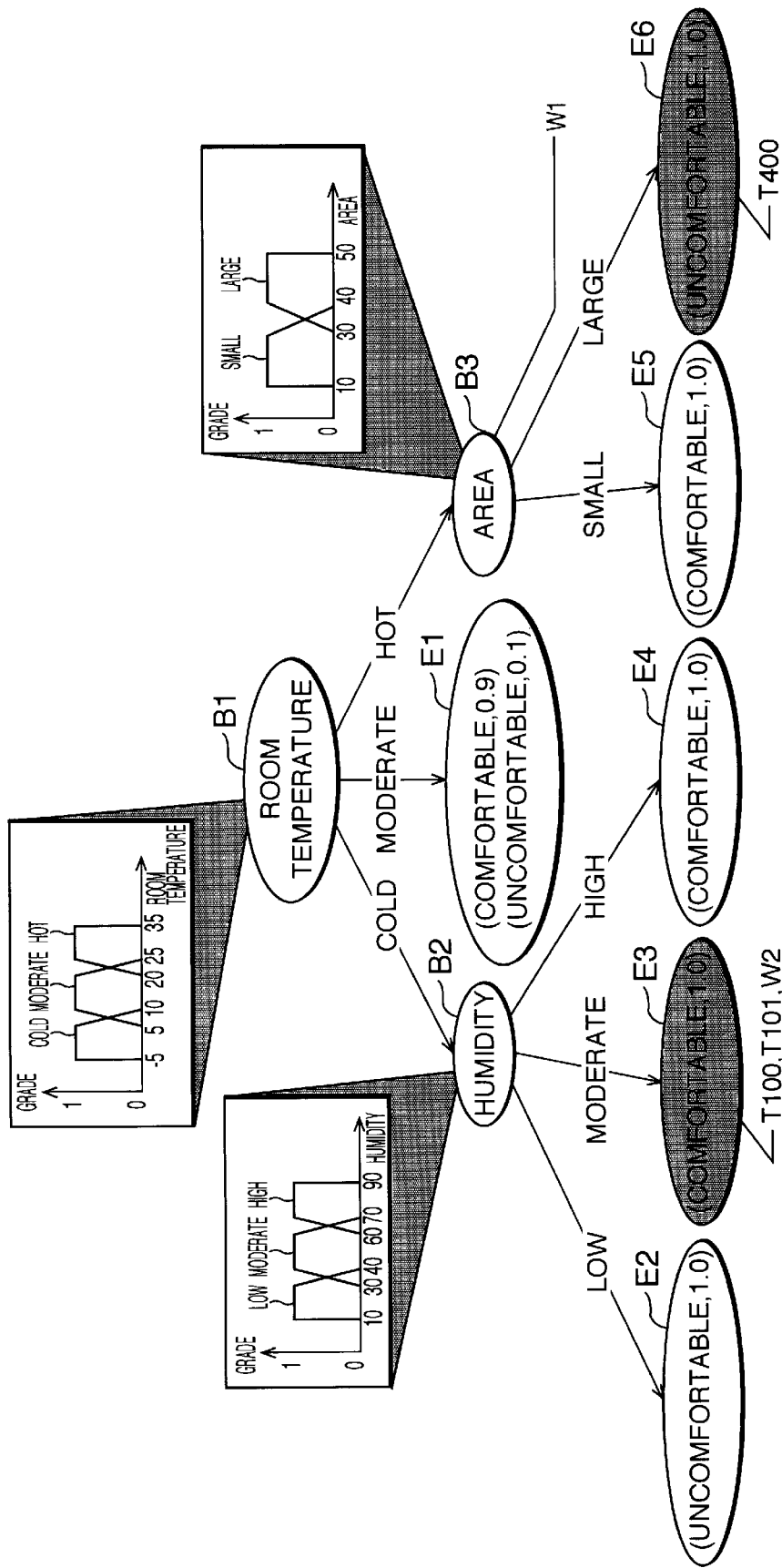
FIG. 10 is a schematic diagram showing a fuzzy decision tree to which new instances W1 and W2 shown in FIG. 9 are assigned.

For example, with respect to the fuzzy decision tree shown in FIG. 10, the end node E3 is considered. In this example, it is assumed that the number of instances of the end node E3 is 3 and the area of the fuzzy branch determination item is 30. At this point, since the density of the instances is 0.1, assuming that the threshold value t is 0.09, it is determined that the end node E3 is not a refinement object, the flow advances to step S4. Next, the branch node B3 is considered. At the branch node B3, since the instance W1 is not included as a fuzzy branch determination item, the region surrounded by the maximum value of the fuzzy branch determination item "large" at the right-end edge, the attribute value "60 m$^2$" of the attribute "area" of the instance 1, the axis X, and the grade "1.0" is treated as the relevant area. Thus, the area becomes 10 and the density of the instance becomes 0.1. Consequently, since the branch node B3 is not a refinement object, the flow advances to step S4.

Figure 11:
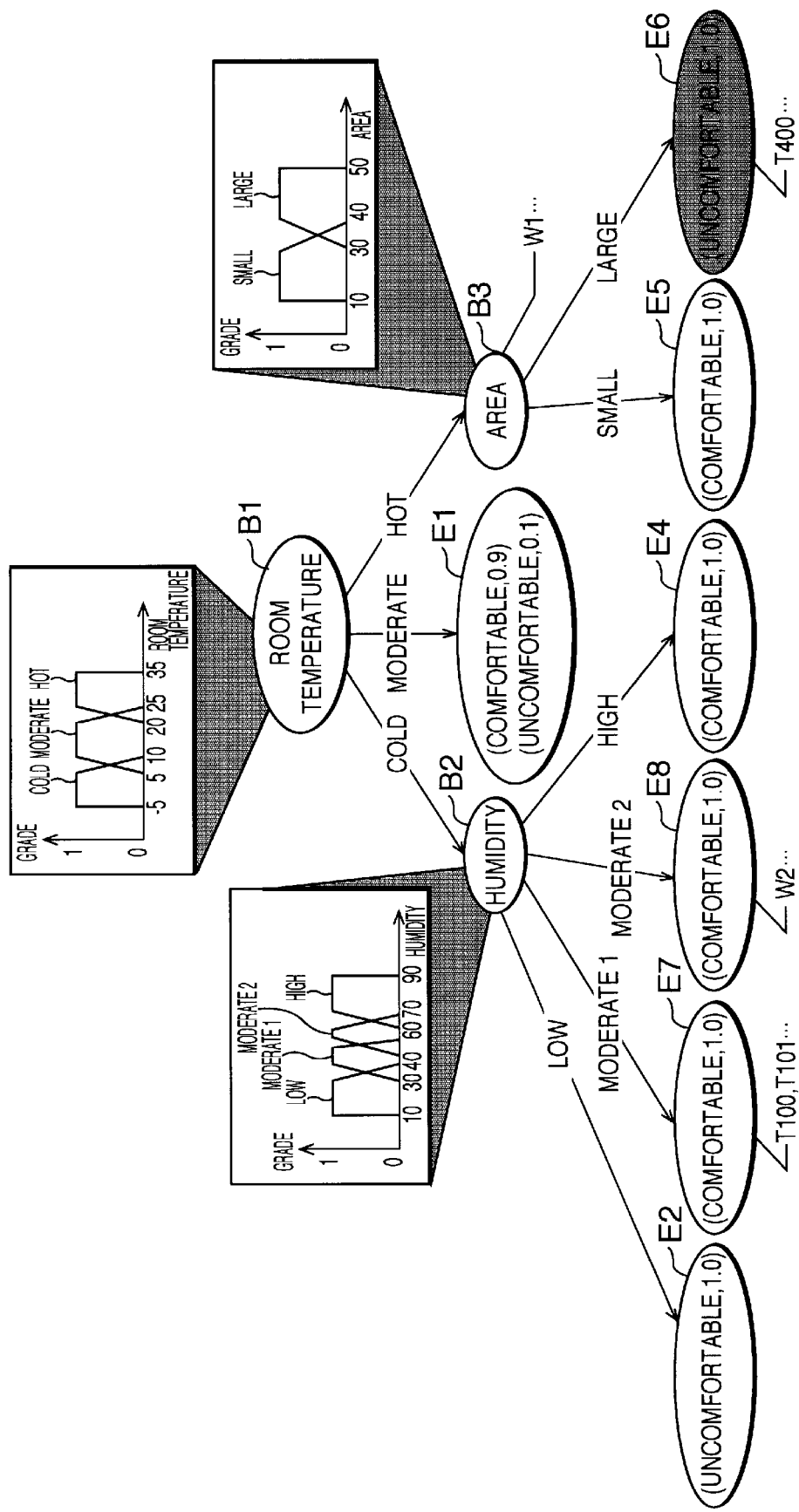
FIG. 11 is a schematic diagram showing a fuzzy decision tree of which an end node E3 has been refined.

At step S12 shown in FIG. 3, the decision tree refining portion 107 refines a node determined as a refinement object by the decision tree refinement object determining portion 106. When the node as a refinement object is an end node, a branch connected to the end node is deleted. Next, the IDF algorithm described in "Generation of Fuzzy Decision Tree by Inductive Learning", Proceedings of The Transactions of Institute of Electric Engineers of Japan, Vol 113-c, No. 7, pp. 488–494, 1993 is applied for the training instance assigned to the end node so as to generate a partial fuzzy decision tree. For example, it is assumed that by continuously estimating a feature amount of an evaluation object with the fuzzy decision tree shown in FIG. 10, the density of the instance of the end node E3 exceeds the threshold value t (0.09). In this case, the branch that connects the branch node B2 and the end node E3 is deleted. By applying the IDF algorithm for the instances T100, T101, W2, and so forth assigned to the end node E3, a fuzzy decision tree shown in FIG. 11 is generated.

Figure 12:
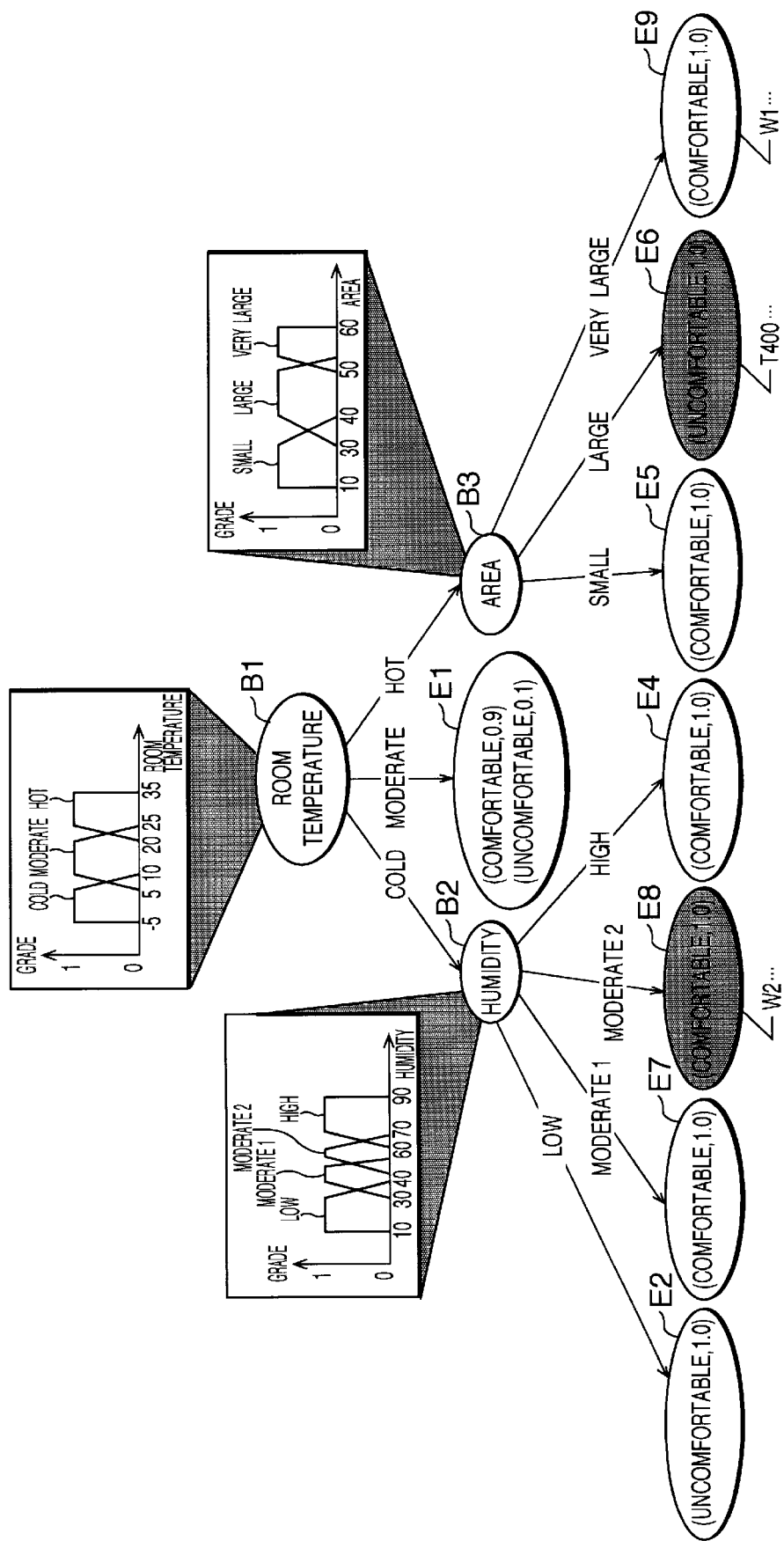
FIG. 12 is a schematic diagram showing a fuzzy decision tree of which a branch node B3 has been refined.

When the node as a refinement object is a branch node, the training instance assigned to the branch node is divided into a portion that is smaller than the fuzzy branch determination item of the branch node and a portion that is larger than the fuzzy branch determination item. Thereafter, the IDF algorithm is applied for each divided training instance so as to generate a partial fuzzy decision tree. For example, it is assumed that by continuously estimating a feature amount of an evaluation object with the fuzzy decision tree shown in FIG. 11, the density of the instance of the branch node B3 exceeds the threshold value t (0.09). In addition, it is assumed that the attribute value of the attribute "area" of the training instance assigned to the branch node B3 is larger than "50 $m^2$". In this case, it is not necessary for the portion that is smaller than the fuzzy branch determination item of the attribute "area" to generate a partial fuzzy decision tree. Thus, the IDF algorithm is applied for only the portion larger than the fuzzy branch determination item so as to generate a partial fuzzy decision tree. In other words, a fuzzy decision tree shown in FIG. 12 is generated.

At step S13 shown in FIG. 3, the decision tree refinement object determining portion 106 recalculates the density of an instance of an end node with the formula (1). At this point, when the density of the instance is smaller than the threshold value t (0.09), the end node is treated as a refinement object. On the other hand, when the density of the instance is larger than the threshold value t (0.09), the end node is not treated as a refinement object. For example, in the fuzzy decision tree shown in FIG. 12, the density of an instance of a node E9 exceeds the threshold value t (0.09). Thus, the end node E9 is not treated as a refinement object.

At step S14 shown in FIG. 3, the stored instance determining portion 108 deletes an instance of an end node deleted from a refinement object from the instance storing portion 102. In the case of the fuzzy decision tree shown in FIG. 12, since the end node E9 is deleted from a refinement object, an instance W1 and so forth assigned to the end node E9 are deleted from the instance storing portion 102.

Thus, while performing an evaluation with a fuzzy decision tree, the determination rule refining apparatus according to the embodiment can determine and refine an imperfect portion of a fuzzy decision tree. In addition, unnecessary instances other than those assigned to nodes as refinement objects of the fuzzy decision tree can be automatically deleted by the instance storing portion 102. Thus, the storage capacity of the memory necessary for the instance storing portion 102 can be decreased.

It should be noted that the present invention is not limited to the above-described embodiment. In other words, in the above-described embodiment, after a fuzzy decision tree is generated with the IDF algorithm, the fuzzy decision tree is refined by the determination rule refining apparatus. Instead, a fuzzy decision tree generated outside the apparatus is stored in the decision tree storing portion 101. An instance assigned to a node as a refinement object in the fuzzy decision tree is stored in the instance storing portion 102. By executing step S4 and later of the flow chart shown in FIG. 3, the fuzzy decision tree can be refined.

In addition, as a determination rule in a decision tree form handled by the determination rule refining apparatus, the conventional decision tree described in "Artificial Intelligence Handbook", Kyoritsu Shuppan K. K. Vol 3, Page 529, 1984 can be used.

In the above-described embodiment, it is determined whether or not a fuzzy decision tree is refined with the density of an instance defined in the formula (1). Alternatively, the refinement of the fuzzy decision tree may be started corresponding to input data of the expert.

Moreover, even if the determination of the refinement of the fuzzy decision tree is automatically performed, after a predetermined number of evaluation objects have been evaluated, the fuzzy decision tree may be refined.

In the above-described embodiment, for an evaluation object that cannot be evaluated or an evaluation object of which the accuracy of the feature amount is not high, the expert is requested to input a feature amount for the evaluation object. However, knowledge base of this portion may have been prepared beforehand. With the knowledge base, the feature amount of the evaluation object may be estimated.

In the above-described embodiment, as an attribute of a fuzzy decision tree, a discrete attribute is not used. However, by defining an amount corresponding to the area of a fuzzy branch determination item as an attribute value, the discrete attribute can be used.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. An apparatus for refining a determination rule corresponding to a probability of an inference result of an evaluation object, comprising:

means for storing a first category class and a first reliability thereof;

means for storing a second category class and a second reliability thereof;

means for assigning an instance used to generate the second category class;

means for storing a determination rule for determining a first grade for the first category class and a second grade for the second category class corresponding to the value of an attribute defining a feature of the evaluation object;

means for categorizing the evaluation object corresponding to the first and second reliabilities and the first and second grades;

means for allowing class category data to be input when the evaluation object is categorized as the second category class; and means for storing an instance having the evaluation object and the input class category data as an instance used to generate the second category class data.

2. The apparatus as set forth in claim 1, further comprising:
   means for deleting a stored instance on the basis of a predetermined threshold value and a parameter that represents the number of instances assigned to the second category class.

3. The apparatus as set forth in claim 1, further comprising:
   means for allowing class category data to be input for an evaluation object of which the determination rule storing means cannot determine a grade of the category class; and
   means for storing an instance having an evaluation object and the input class category data as an instance used to generate a third category class.

4. The apparatus as set forth in claim 3, further comprising:
   means for deleting a stored instance on the basis of a predetermined threshold value and a parameter that represents the number of instances assigned to the third category class.

5. The apparatus as set forth in claim 3, further comprising:
   means for newly generating a third category class corresponding to instances assigned to the determination rule storing means on the basis of the parameter that represents the number of instances and a predetermined threshold value.

6. The apparatus as set forth in claim 1, further comprising:
   means for dividing the second category class into a third category class and a fourth category class on the basis of a parameter that represents the number of instances assigned to the second category class storing means and a predetermined threshold value.

7. The apparatus as set forth in claim 6,
   wherein the determination rule stored in the determination rule storing means has a predetermined membership function, and
   wherein the parameter that represents the number of instances is a density of an instance as expressed by the following formula:
   density of instance=number of instances/predetermined area
   where the predetermined area is an area of a region surrounded by the membership function corresponding to the value of the attribute for dividing the region on the basis of the attribute and the axis X.

8. A method for storing a first category class and a reliability thereof, storing a second category class and a reliability thereof, assigning an instance used to generate the class, storing a determination rule for determining a grade for each category class corresponding to a value of an attribute defining a feature of an evaluation object, and categorizing the evaluation object corresponding to the value of the attribute of the evaluation object, comprising the steps of:
   categorizing the input evaluation object corresponding to the reliability and the grade;
   allowing categorized data to be input when the evaluation object is categorized corresponding to the second category class; and
   storing an instance having the evaluation object and the input categorized data as an instance used to generate the second category class.

9. The method as set forth in claim 8, further comprising the step of:
   deleting a stored instance on the basis of the parameter that represents the number of instances assigned to the second category class and a predetermined threshold value.

10. The method as set forth in claim 8, further comprising the step of:
    allowing categorized data for an evaluation object of which the grade of the categorized class cannot be determined by determination rule storing means to be input;
    storing an instance having the evaluation object and the input categorized data as an instance used to generate a third category class; and
    assigning the instance to the determination rule storing means.

11. The method as set forth in claim 10, further comprising the step:
    newly generating a third category class corresponding to instances assigned to the determination rule storing means on the basis of the parameter that represents the number of the instances and a predetermined threshold value.

12. The method as set forth in claim 10, further comprising the step of:
    deleting a stored instance on the basis of the parameter that represents the number of instances assigned to the third category class and a predetermined threshold value.

13. The method as set forth in claim 8, further comprising the step of:
    dividing the second category class into a fourth category class and a fifth category class on the basis of the parameter that represents the number of instances assigned to second category class storing means and a predetermined threshold value.

14. The method as set forth in claim 8, further comprising the step of:
    generating a sixth category class and a seventh category class branched from the second category class on the basis of the parameter that represents the number of instances assigned to a second category class storing means and a predetermined threshold value.

15. A medium on which a program, for refining a determination rule corresponding to a probability of an inference result of an evaluation object, is recorded, the program comprising:
    means for storing a first category class and a first reliability thereof;
    means for storing a second category class and a second reliability thereof;
    means for assigning an instance used to generate the second category class;
    means for storing a determination rule for determining a first grade for the first category class and a second grade for the second category class corresponding to the value of an attribute defining a feature of the evaluation object;
    means for categorizing the evaluation object corresponding to the first and second reliabilities and the first and second grades;

means for allowing class category data to be input when the evaluation object is categorized as the second category class; and means for storing an instance having the evaluation object and the input class category data as an instance used to generate the second category class data.

16. The medium as set forth in claim 15, the program further comprising;

means for deleting the stored instance on the basis of a predetermined threshold value and a parameter that represents the number of instances assigned to the second category class.

17. The medium as set forth in claim 15, the program further comprising:

means for allowing class category data to be input for an evaluation object of which the determination rule storing means cannot determine a grade of the category class; and means for storing an instance having an evaluation object and the input class category data as an instance used to generate a third category class.

18. The medium as set forth in claim 17, the program further comprising:

means for deleting a stored instance on the basis of a predetermined threshold value and a parameter that represents the number of instances assigned to the third category class.

19. The medium as set forth in claim 17, the program further comprising:

means for newly generating a third category class corresponding to instances assigned to the determination rule storing means on the basis of the parameter that represents the number of instances and a predetermined threshold value.

20. The medium as set forth in claim 15, the program further comprising:

means for dividing the second category class into a third category class and a fourth category class on the basis of a parameter that represents the number of instances assigned to the second category class storing means and a predetermined threshold value.

21. The medium as set forth in claim 20, wherein the determination rule stored in the determination rule storing means has a predetermined membership function, and wherein the parameter that represents the number of instances is a density of an instance as expressed by the following formula:

density of instance=number of instances/predetermined area where the predetermined area is an area of a region surrounded by the membership function corresponding to the value of the attribute for dividing the region on the basis of the attribute and the axis X.

* * * * *